US007890807B2

(12) United States Patent
Verbowski et al.

(10) Patent No.: US 7,890,807 B2
(45) Date of Patent: *Feb. 15, 2011

(54) METHOD AND SYSTEM FOR TROUBLESHOOTING A MISCONFIGURATION OF A COMPUTER SYSTEM BASED ON CONFIGURATIONS OF OTHER COMPUTER SYSTEMS

(75) Inventors: Chad E. Verbowski, Redmond, WA (US); Jiahe Helen Wang, Issaquah, WA (US); John C. Platt, Redmond, WA (US); Ruyun Zhang, Beijing (CN); Yu Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 196 days.

This patent is subject to a terminal disclaimer.

(21) Appl. No.: 11/762,634

(22) Filed: Jun. 13, 2007

(65) Prior Publication Data

US 2007/0300103 A1  Dec. 27, 2007

Related U.S. Application Data

(63) Continuation of application No. 10/918,786, filed on Aug. 13, 2004.

(60) Provisional application No. 60/545,799, filed on Feb. 19, 2004, provisional application No. 60/547,608, filed on Feb. 24, 2004.

(51) Int. Cl.
*G06F 11/00* (2006.01)
*G06F 11/36* (2006.01)

(52) U.S. Cl. .............................. 714/38; 714/26; 714/39; 717/120; 717/121; 726/22; 726/23; 726/24

(58) Field of Classification Search ................. 713/100; 717/168–178, 120, 121; 700/28, 29; 714/26, 714/31, 33, 37, 38, 39; 726/22, 23, 24
See application file for complete search history.

(56) References Cited

U.S. PATENT DOCUMENTS 5,511,191 A    4/1996   de Leeuw van Weenen et al.

(Continued)

FOREIGN PATENT DOCUMENTS

GB           2372670            8/2002

(Continued)

OTHER PUBLICATIONS

Novell Documentation's Aggregate Data copyright 1999, retrieved Apr. 28, 2008 http://www.novell.com/documentation/extendas37/docs/help/java/jdkee/cloudscape/doc/html/tutorial/virt4.htm.*

(Continued)

*Primary Examiner*—Scott T Baderman
*Assistant Examiner*—Joseph Schell
(74) *Attorney, Agent, or Firm*—Perkins Coie LLP

(57) ABSTRACT

A method and system for identifying a configuration parameter of a "sick" computer system that is at fault for causing an undesired behavior based on analysis of configuration parameters from other computer systems is provided. In one embodiment, a troubleshooting system collects "suspect" values for "suspect" configuration parameters used by a "sick" application when the undesired behavior was exhibited by the sick computer system. The troubleshooting system then compares the suspect values to sample values of the suspect configuration parameters retrieved from sample computer systems. The troubleshooting system uses that comparison to identify one or more suspect configuration parameters that are likely at fault for causing the application to exhibit the undesired behavior.

30 Claims, 8 Drawing Sheets

U.S. PATENT DOCUMENTS

| | | | |
|---|---|---|---|
| 5,822,743 | A | 10/1998 | Gupta et al. |
| 5,867,714 | A * | 2/1999 | Todd et al. ............... 717/172 |
| 5,996,075 | A | 11/1999 | Matena |
| 6,047,332 | A | 4/2000 | Viswanathan et al. |
| 6,084,877 | A | 7/2000 | Egbert et al. |
| 6,108,800 | A | 8/2000 | Asawa |
| 6,473,659 | B1 * | 10/2002 | Shah et al. ............... 700/79 |
| 6,658,602 | B1 * | 12/2003 | Nakano ............... 714/38 |
| 6,671,811 | B1 * | 12/2003 | Diep et al. ............... 726/23 |
| 6,691,249 | B1 | 2/2004 | Barford et al. |
| 6,704,752 | B1 | 3/2004 | Kathail et al. |
| 6,738,811 | B1 | 5/2004 | Liang |
| 6,763,482 | B2 * | 7/2004 | Bernklau-halvor ........... 714/25 |
| 6,768,721 | B1 | 7/2004 | Schmitz et al. |
| 6,862,696 | B1 * | 3/2005 | Voas et al. ............... 714/38 |
| 6,880,107 | B1 * | 4/2005 | Kraft, IV ............... 714/36 |
| 6,895,534 | B2 * | 5/2005 | Wong et al. ............... 714/55 |
| 6,970,943 | B1 | 11/2005 | Subramanian et al. |
| 6,990,602 | B1 * | 1/2006 | Skinner et al. ............... 714/4 |
| 7,002,993 | B1 | 2/2006 | Mohaban et al. |
| 7,058,861 | B1 | 6/2006 | Adams |
| 7,069,473 | B2 * | 6/2006 | Yasuda ............... 714/37 |
| 7,100,084 | B2 | 8/2006 | Unkle et al. |
| 7,103,874 | B2 | 9/2006 | McCollum et al. |
| 7,117,312 | B1 | 10/2006 | Cypher |
| 7,120,933 | B2 * | 10/2006 | Mattsson ............... 726/22 |
| 7,134,008 | B2 * | 11/2006 | Dutt et al. ............... 713/1 |
| 7,191,290 | B1 | 3/2007 | Ackaouy et al. |
| 7,203,729 | B2 | 4/2007 | Chen et al. |
| 7,209,932 | B2 | 4/2007 | Dewey |
| 7,225,343 | B1 * | 5/2007 | Honig et al. ............... 713/194 |
| 7,320,035 | B2 | 1/2008 | Kumar et al. |
| 7,325,185 | B1 * | 1/2008 | Szor ............... 714/799 |
| 7,386,839 | B1 | 6/2008 | Golender et al. |
| 7,392,295 | B2 | 6/2008 | Yuan et al. |
| 7,430,598 | B2 | 9/2008 | Raden et al. |
| 7,487,543 | B2 * | 2/2009 | Arnold et al. ............... 726/24 |
| 7,492,789 | B2 | 2/2009 | Shvodian |
| 7,584,382 | B2 | 9/2009 | Verbowski et al. |
| 2001/0005821 | A1 | 6/2001 | Ottosson |
| 2002/0124187 | A1 | 9/2002 | Lyle et al. |
| 2002/0184555 | A1 * | 12/2002 | Wong et al. ............... 714/4 |
| 2003/0050980 | A1 | 3/2003 | Dutta et al. |
| 2003/0204632 | A1 | 10/2003 | Willebeek-LeMair et al. |
| 2003/0225899 | A1 | 12/2003 | Murphy |
| 2003/0237017 | A1 * | 12/2003 | Jibbe ............... 714/4 |
| 2004/0006546 | A1 * | 1/2004 | Wedlake et al. ............... 706/46 |
| 2004/0019878 | A1 * | 1/2004 | Kotnur et al. ............... 717/120 |
| 2004/0260678 | A1 | 12/2004 | Verbowski et al. |
| 2005/0015639 | A1 | 1/2005 | Cornelius et al. |
| 2005/0102370 | A1 | 5/2005 | Lin et al. |
| 2005/0155031 | A1 | 7/2005 | Wang et al. |
| 2005/0182969 | A1 * | 8/2005 | Ginter et al. ............... 713/201 |
| 2005/0198110 | A1 | 9/2005 | Garms et al. |
| 2006/0036708 | A1 | 2/2006 | Yuan et al. |
| 2006/0117310 | A1 | 6/2006 | Daniels |
| 2006/0174160 | A1 | 8/2006 | Kim |
| 2006/0233152 | A1 | 10/2006 | Suda |
| 2007/0016902 | A1 | 1/2007 | Shozaki et al. |
| 2007/0091808 | A1 | 4/2007 | Raftelis |
| 2007/0140479 | A1 | 6/2007 | Wang et al. |
| 2007/0143280 | A1 | 6/2007 | Wang et al. |
| 2007/0168508 | A1 | 7/2007 | Wang et al. |
| 2007/0300103 | A1 | 12/2007 | Verbowski et al. |
| 2008/0201337 | A1 | 8/2008 | Yuan et al. |

FOREIGN PATENT DOCUMENTS

| | | |
|---|---|---|
| WO | WO-01/65330 A2 | 9/2001 |
| WO | WO-03/009140 | 1/2003 |

OTHER PUBLICATIONS

Definition: canonical retrieved Apr. 28, 2008 http://dictionary.die.net/canonical.*

Definition of Dynamically retrieved May 22, 2010 http://dictionary.reference.com/browse/dynamically.*

U.S. Appl. No. 10/997,685, filed Nov. 24, 2004, Daniels et al.

U.S. Appl. No. 10/918,086, filed Aug. 13, 2004, Yuan et al.

Redstone, Joshua A., Michael M. Swift and Brian N. Bershad, "Using Computers to Diagnose Computer Problems," Proceedings of HotOS IX: The 9th Workshop on Hot Topics in Operating Systems, May 18-21, 2003, USENIX 2003, pp. 91-96.

Wang, Helen J., John Platt, Yu Chen, Ruyun Zhang and Yi-Min Wang, "PeerPressure: A Statistical Method for Automatic Misconfiguration Troubleshooting," Microsoft Research Technical Report MSR-TR-2003-80, Microsoft Corporation, Nov. 2003, 13 pages.

Apap, Frank, Andrew Honig, Shlomo Hershkop, Eleazar Eskin and Sal Stolfo, "Detecting Malicious Software by Monitoring Anomalous Windows Registry Accesses," In Proceedings of LISA 1999, pp. 1-13.

Przydatek, Bartosz, Dawn Song and Adrian Perrig, "SIA: Secure Information Aggregation in Sensor Networks," SenSys Nov. 2003, ACM 2003, pp. 255-265.

Liblit, Ben, Alex Aiken, Alice X. Zheng and Michael I. Jordan, "Bug Isolation via Remote Program Sampling," PLDI'03, Jun. 9-11, ACM 2003, pp. 141-154.

KaZaa, http://www.kazaa.com, 1 page.

Larsson, Magnus and Ivica Crnkovic, "Configuration Management for Component-based Systems," In Proceedings of International Conference on Software Engineering May 2001, 5 pages.

Goldschlag, David, Michael Reed and Paul Syverson, "Onion Routing for Anonymous and Private Internet Connections," CACM Feb. 1999, 5 pages.

Kremenek, Ted and Dawson Engler, "Z-Ranking: Using Statistical Analysis to Counter the Impact of Static Analysis Approximation," Proceedings of the 10th Annual International Static Analysis Symposium Jun. 2003, 21 pages.

Clarke, Ian, Oskar Sandberg, Brandon Wiley and Theodore W. Hong, "Freenet: A Distributed Anonymous Information Storage and Retrieval System," Lecture Notes in Computer Science, Springer-Verlag GmbH, ISSN: 0302-9743, vol. 2009 / 2001, p. 46, online date Jun. 2003, 21 pages.

Wang, Helen J., Chun Yuan, Yih-Chun Hu, Zheng Zhang and Yi-min Wang, "Friends Troubleshooting Network, Towards Privacy-Preserving, Automatic Troubleshooting," Microsoft Research Paper MSR-TR-2003-81, Microsoft Research, Nov. 2003, 6 pages.

Benaloh, Josh Daniel Cohen, "Verifiable Secret-Ballot Elections," Dissertation, Yale University, Dec. 1996, Josh Daniel Cohen Benaloh 1988, 132 pages.

Forrest, Stephanie, Steven A. Hofmeyr, Anil Somayaji and Thomas A. Longstaff, "A Sense of Self for Unix Processes," In Proceedings of the 1996 Symposium on Security and Privacy, IEEE Computer Society Press, 1996, 9 pages.

Tripwire, Inc., http://www.tripwire.com/.

Paxson, Vern, "Bro: A System for Detecting Network Intruders in Real-Time," Computer Networks, 31 (23-24), Dec. 14, 1999, pp. 1-22.

"Web-to-Host: Reducing the Total Cost of Ownership," The Tolly Group Total Cost of Ownership White Paper, May 2000, 13 pages.

Couch, Dr. Alva L. and Michael Gilfix, "It's Elementary, Dear Watson: Applying Logic Programming to Convergent System Management Processes," In proceedings of LISA XIII Nov. 7-12, 1999 pp. 121-135.

Wang, Yi-Min, Chad Verbowski, John Dunagan, Yu Chen, Helen J. Wang, Chun Yuan and Zheng Zhang, "Strider: A Black-box, State-based Approach to Change and Configuration Management and Support," Proceedings of the 17th Large Installation Systems Administration Conference, Oct. 26-31, 2003, USENIX 2003, pp. 159-171.

Engler, Dawson, David Yu Chen, Seth Hallem, Andy Chou and Benjamin Chelf, "Bugs as Deviant Behavior: A General Approach to Inferring Errors in Systems Code," In proceedings of ACM Symposium on Operating Systems Principles, Oct. 2001, 23 pages.

Keller, Alexander and Christian Ensel, "An Approach for Managing Service Dependencies with XML and the Resource Description Framework," IBM Research Report, RC 22307 Jan. 15, 2002, Computer Science, IBM Research Division, pp. 1-17.

Burgess, Mark, "A Site Configuration Engine," In Computer Systems 1995, pp. 1-29.

Traugott, Steve and Joel Huddleston, "Bootstrapping an Infrastructure," Proceedings of the 12th Systems Administration Conference, LISA Dec. 1998, USENIX, pp. 181-196.

Freedman, Michael J., Emil Sit, Josh Cates and Robert Morris, "Introducing Tarzan, a Peer-to-Peer Anonymizing Network Layer," IPTPS 2002, 6 pages.

Handley, Mark, Vern Paxson and Christian Kreibich, "Network Intrusion Detection: Evasion, Traffic Normalization, and End-to-End Protocol Semantics," Presentation at USENIX Security 2002, 31 pages.

Aguilera, Marcos K., Jeffrey C. Mogul, Janet L. Wiener, Patrick Reynolds and Athicha Muthitacharoen, "Performance Debugging for Distributed Systems of Black Boxes," SOSP'03, Oct. 19-22, 2003, ACM 2003, 16 pages.

Chen, Mike Y., Emre Kiciman, Eugene Fratkin, Armando Fox and Eric Brewer, "Pinpoint: Problem Determination in Large, Dynamic Internet Services," In Proceedings of International Conference on Dependable Systems and Networks 2002, 10 pages.

Silver, Michael A. and Leslie Fiering, "Desktop and Notebook TCO Updated for the 21st Century," Sep. 12, 2003, Gartner Teleconference, http://www.dataquest.com/teleconferences/asset_47431.jsp.

Chaum, David, "Untraceable Electronic Mail, Return Addresses, and Digital Pseudonyms," Communications of the ACM, Feb. 1981, vol. 24, No. 2, ACM 1981, 8 pages.

Wang, Yi-Min, Chad Verbowski and Daniel R. Simon, "Persistent-state Checkpoint Comparison for Troubleshooting Configuration Failures," Microsoft Technical Report MSR-TR-2003-28, Microsoft Research, Microsoft Corporation, Apr. 4, 2003, IEEE 2003, 7 pages.

Osterlund, Robert, "PIKT: Problem Informant/Killer Tool," Proceedings of the 14th Systems Administration Conference, Dec. 3-8, 2000, USENIX 2000, pp. 147-165.

Solomon, David A. and Mark E. Russinovich, "Chapter 5—Management Mechanisms," Inside Microsoft Windows 2000, Third Edition, Microsoft Press, David A. Solomon and Mark E. Russinovich 2000, 75 pages.

Reiter, Michael K. and Aviel D. Rubin, "Crowds: Anonymity for Web Transactions," ACM Transactions on Information and System Security, vol. 1, No. 1, Nov. 1998, ACM 1998, pp. 66-92.

Fujioka, Atsushi, Tatsuaki Okamoto and Kazuo Ohta, "A Practical Secret Voting Scheme for Large Scale Elections," Advances in Cryptology AUSCRYPT '92, Dec. 13-16, 1992 Proceedings, Springer-Verlag 1993, pp. 244-251.

"Buffer Overrun in RPC Interface Could Allow Code Execution," Microsoft Security Bulletin MS03-026, Microsoft TechNet, revised Sep. 10, 2003, 8 pages, http://www.micrsoft.com/technet/security/bulletin/MS03-026.mspx?pf=true, [last accessed Jul. 21, 2005].

"Byacc—Berkeley YACC," 1 page, http://dickey.his.com/byacc/byacc.html, [last accessed Jul. 22, 2005].

"Change Auditing Solutions—Tripwire, Inc.," © 2005 Tripwire, Inc., http://www.tripwire.com/, [last accessed Jul. 21, 2005].

"DCE 1.1: Remote Procedure Call," Technical Standard, CAE Specification, © Oct. 1997, Published in the U.K. by The Open Group Oct. 1997, Table of Contents through Chapter 2.

"Flex—a scanner generator—Table of Contents," GNU Project, Free Software Foundation, last updated Nov. 7, 1998, 1 page, http://www.gnu.org/software/flex/manual/, [last accessed Jul. 21, 2005].

"Snort—the de facto standard for intrusion detection/prevention", 1 page, http://www.snort.org/, [last accessed Jul. 22, 2005].

"Unchecked Buffer in Index Server ISAPI Extension Could Enable Web Server Compromise," Microsoft Security Bulletin MS01-033, Microsoft TechNet, updated Nov. 4, 2003, © 2005 Microsoft Corporation, http://www.microsoft.com/technet/security/bulletin/MS01-033.mspx?pf=true, [last accessed Jul. 21, 2005].

"UrlScan Security Tool," Microsoft TechNet, 8 pages, © 2005 Microsoft Corporation, http://www.microsoft.com/technet/security/tools/urlscan.mspx?pf=true [last accessed Jul. 21, 2005].

Agrawal, Rakesh and Ramakrishnan Srikant, "Privacy-Preserving Data Mining," In Proceedings of ACM SIGMOD 2000.

Bashar, Mohd A. et al., "Low-Threat Security Patches and Tools," Proceedings of International Conference on Software Maintenance, Oct. 1-3, 1997, Bari, Italy, IEEE Computer Society, pp. 306-313, © 1997 by The Institute of Electrical and Electronics Engineers, Inc.

Beattie, Steve et al., "Timing the Application of Security Patches for Optimal Uptime," 2002 LISA XVI, Nov. 3-8, 2002, Philadelphia, PA, pp. 101-110.

Canny, John, "Collaborative Filtering with Privacy," 2002 IEEE Symposium on Security and Privacy, p. 45.

Chen, Shuo et al., "A Data-Driven Finite State Machine Model for Analyzing Security Vulnerabilities," Proceedings of the 2003 International Conference on Dependable Systems and Networks (DSN'03), © 2003 IEEE, 10 pages.

Chen, Zesheng et al., "Modeling the Spread of Active Worms," IEEE INFOCOM 2003, © 2003 IEEE, 11 pages.

Coney, Lillie et al., "Towards a Privacy Measurement Criterion for Voting Systems," Poster paper, National Conference on Digital Government Research, May 2005.

Cramer, Ronald et al., "A Secure and Optimally Efficient Multi-Authority Election Scheme," In Advances in Cryptology—EUROCRYPT'97, vol. 1233 of Lecture Notes in Computer Science, Springer-Verlag, 1997, pp. 103-118.

Cramer, Ronald et al., "Proofs of Partial Knowledge and Simplified Design of Witness Hiding Protocols," Advances in Cryptology—CRYPTO'94, vol. 839 of Lecture Notes in Computer Science, Springer-Verlag, 1994, pp. 174-187.

Douceur, John R., "The Sybil Attack," IPTPS'02 Workshop, Cambridge, MA, Mar. 2002.

Fiat, Amos and Adi Shamir, "How to Prove Yourself: Practical Solutions to Identification and Signature Problems," Advances in Cryptology—CRYPTO'86, LNCS 263, pp. 186-194, 1987, ® Springer-Verlag Berlin Heidelberg 1987.

Fielding, R., et al., "Hypertext Transfer Protocol—HTTP/1.1," Jun. 3, 1996, HTTP Working Group, Internet-Draft, 105 pages.

Ganger, Gregory R. et al., "Finding and containing enemies within the walls with self-securing network interfaces," Technical Report CMU-CS-03-109, Carnegie Mellon University, School of Computer Science, Jan. 2003, 24 pages.

Hsieh, Hung-Yun and Raghupathy Sivakumar, "A Transport Layer Approach for Achieving Aggregate Bandwidths on Multi-homed Mobile Hosts," MOBICOM'02, Sep. 23-26, 2002, Atlanta, Georgia, © 2002 ACM, 12 pages.

Jakobsson, Markus et al., "Making Mix Nets Robust for Electronic Voting by Randomized Partial Checking," Feb. 1, 2002, USENIX Security'02, pp. 339-353, 2002.

Kamara, Seny et al., "Analysis of Vulnerabilities in Internet Firewalls," Computers & Security, vol. 22, No. 3, Copyright Elsevier 2003, pp. 214-232.

Katz, Jonathan et al., "Cryptographic Counters and Applications to Electronic Voting," EUROCRYPT 2001, LNCS 2045, pp. 78-92, 2001, © Springer-Verlag Berlin Heidelberg 2001.

Kissner, Lea and Dawn Song, "Privacy-Preserving Set Operations," Feb. 2005—Last modified Jun. 2005, Carnegie Mellon University, School of Computer Science, CMU-CS-05-113.

Klensin, J., "Simple Mail Transfer Protocol," RFC: 2821, Network Working Group, Standards Track, Apr. 2001, © The Internet Society 2001, 70 pages.

Kohler, Eddie et al., "Programming language techniques for modular router configurations," Technical Report LCS-TR-812, MIT Laboratory for Computer Science, 2000, pp. 1-22.

Microsoft Security Bulletin MS02-039, "Buffer Overruns in SQL Server 2000 Resolution Service Could Enable Code Execution (Q323875)," Microsoft TechNet, updated Jan. 31, 2003, 6 pages.

Moore, David et al., "Code-Red: a case study on the spread and victims of an Internet worm," CAIDA, San Diego Supercomputer Center, University of California San Diego, 12 pages, ACM Internet Measurement Workshop 2002.

Moore, David et al., "Inside the Slammer Worm," Slammer Worm Dissection, IEEE Security & Privacy, Published by IEEE Computer Society, © 2003 IEEE, pp. 33-39.

Moore, David et al., "Internet Quarantine: Requirements for Containing Self-Propagating Code," IEEE INFOCOM 2003, © 2003 IEEE, 10 pages.

Noar, Moni, "Bit Commitment Using Pseudo-Randomness," Feb. 25, 2001, IBM Almaden Research Center, Journal of Cryptology, vol. 4, Proceedings of CRYPTO 1989.

Postel, J. and J. Reynolds, "File Transfer Protocol (FTP)," RFC: 959, Network Working Group, Oct. 1985, pp. 1-69.

Postel, J. and J. Reynolds, "Telnet Protocol Specification," RFC: 854, May 1983, Network Working Group.

Razmov, Valentin and Daniel R. Simon, "Practical Automated Filter Generation to Explicitly Enforce Implicit Input Assumptions," In Proceedings of the 17th Annual Computer Security Applications Conference, New Orleans, Louisiana, Dec. 2001, 11 pages.

Rescorla, Eric, "Security holes . . . Who cares?," in Proceedings of USENIX Security Symposium, Aug. 2003, 17 pages.

Ritchey, Ronald W. and Paul Ammann, "Using Model Checking to Analyze Network Vulnerabilities," Security and Privacy 2000, 2000 IEEE Symposium, © 2000 IEEE, pp. 156-165.

Schulzrinne, H. et al., "RTP: A Transport Protocol for Real-Time Applications," Jan. 1996, Network Working Group, RFC 1889, Standards Track, 75 pages.

Shankar, Umesh, "Active Mapping: Resisting NIDS Evasion Without Altering Traffic," Dec. 2002, Report No. UCB//CSD-2-03-1246, Computer Science Division (EECS), University of California Berkeley, 38 pages.

Shannon, C.E., "A Mathematical Theory of Communication," Reprinted with corrections from The Bell System Technical Journal, vol. 27, pp. 379-423, 623-656, Jul., Oct. 1948.

Sharpe, Richard, "Just what is SMB?" Oct. 8, 2002, 9 pages http://samba.anu.edu.au/cifs/docs/what-is-smb.html [last accessed Jul. 26, 2005].

Singh, Sumeet et al., "The EarlyBird System for Real-Time Detection of Unknown Worms," Technical Report CS2003-0761, University of California at San Diego, 2003, pp. 1-6.

Staniford, Stuart et al., "How to Own the Internet in Your Spare Time," Proceedings of the 11th USENIX Security Symposium, San Francisco, California, Aug. 5-9, 2002, 20 pages.

Wagner, David, "Resilient Aggregation in Sensor Networks," SASN'04, Oct. 25, 2004, Washington, DC, © 2004 ACM.

Wang, Helen J. et al., "Automatic Misconfiguration Troubleshooting with PeerPressure," 6th Symposium on Operating Systems Design & Implementation, 2004, USENIX.

Weaver, Nicholas C., "Warhol Worms: The Potential for Very Fast Internet Plagues," Regents of the University of California, 2001, 9 pages, http://www.csua.berkeley.edu/~nweaver/warhol.html, [last accessed Aug. 10, 2007].

Weaver, Nicholas et al., "Large Scale Malicious Code: A Research Agenda," Mar. 2003, 43 pages.

Williamson, Matthew M., "Throttling Viruses: Restricting propagation to defeat malicious mobile code," HPL-2002-172, Jun. 17, 2002, HP Laboratories Bristol, © Hewlett-Packard Company 2002, 7 pages.

Novell Documentation's Aggregate Data, Copyright 1999 [last accessed Jan. 22, 2009], http://www.novell.com/documentation/extendas37/docs/help/java/jdkee/cloudscape/doc/html/tutorial/virt4.htm.

Definition: Canonical [last accessed Jan. 20, 2009], http://dictionary.die.net/canonical.

"DCE 1.1: Remote Procedure Call," Technical Standard, CAE Specification, © Oct. 1997, Published in the U.K. by The Open Group Oct. 1997, Appendix and Index, pp. 653-716.

"DCE 1.1: Remote Procedure Call," Technical Standard, CAE Specification, © Oct. 1997, Published in the U.K. by The Open Group Oct. 1997, Chapter 11, 481-574.

"DCE 1.1: Remote Procedure Call," Technical Standard, CAE Specification, © Oct. 1997, Published in the U.K. by The Open Group Oct. 1997, Chapter 3, pp. 170-296.

"DCE 1.1: Remote Procedure Call," Technical Standard, CAE Specification, © Oct. 1997, Published in the U.K. by The Open Group Oct. 1997, Chapter 3, pp. 55-169.

"DCE 1.1: Remote Procedure Call," Technical Standard, CAE Specification, © Oct. 1997, Published in the U.K. by The Open Group Oct. 1997, Chapters 12 through 14, pp. 575-652.

"DCE 1.1: Remote Procedure Call," Technical Standard, CAE Specification, © Oct. 1997, Published in the U.K. by The Open Group Oct. 1997, Chapters 4 and 5, pp. 297-356.

"DCE 1.1: Remote Procedure Call," Technical Standard, CAE Specification, © Oct. 1997, Published in the U.K. by The Open Group Oct. 1997, Chapters 6 through 10, pp. 357-480.

* cited by examiner

Here is an indication of which registry settings may be the cause of the application's problem

| Likelihood of being wrong | entry name | current value | most popular value | second most popular value |
|---|---|---|---|---|
| .8 | e2 | .htc/content | text/x-comp | not exist |
| .1 | e1 | .jpg/content | image/jpg | -- |
| .1 | e3 | url-visited | -- | -- |

801 select a value for one or more entries ( update entries )  ( reset to current )

METHOD AND SYSTEM FOR TROUBLESHOOTING A MISCONFIGURATION OF A COMPUTER SYSTEM BASED ON CONFIGURATIONS OF OTHER COMPUTER SYSTEMS

CROSS-REFERENCE TO RELATED APPLICATION(S)

This application is a continuation of U.S. patent application Ser. No. 10/918,786, filed on Aug. 13, 2004, entitled "METHOD AND SYSTEM FOR TROUBLESHOOTING A MISCONFIGURATION OF A COMPUTER SYSTEM BASED ON CONFIGURATIONS OTHER COMPUTER SYSTEMS," which application claims the benefit of U.S. Provisional Application No. 60/545,799, filed on Feb. 19, 2004, entitled "FRIENDS TROUBLESHOOTING NETWORK: TOWARDS PRIVACY-PRESERVING, AUTOMATIC TROUBLESHOOTING" and U.S. Provisional Application No. 60/547,608, filed on Feb. 24, 2004, entitled "METHOD AND SYSTEM FOR TROUBLESHOOTING A MISCONFIGURATION OF A COMPUTER SYSTEM BASED ON CONFIGURATIONS OF OTHER COMPUTER SYSTEMS," which are hereby incorporated by reference in their entireties.

TECHNICAL FIELD

The described technology relates generally to identifying a configuration parameter whose value is causing an undesired behavior.

BACKGROUND

An ever-increasing number of applications (i.e., computer software) with various features are available to users of personal computers. Users can tailor the operation of these applications to suit their needs by specifying various configuration parameters. For example, a browser application may have a configuration parameter that provides a URL of a web page that is displayed initially whenever the browser application starts (i.e., "a home page"). The browser application may also have configuration parameters that identify programs to be invoked to process certain types of content (e.g., a "jpeg" file) and that specify passwords to be used when the application connects to various servers. The values of the configuration parameters can be stored in application-specific configuration files such as UNIX resource files or in a central registry such as the Windows® registry file. The application-specific configuration file for an application may have an internal format that is specific to that application. With a central registry, many different applications can share the same configuration parameters. The applications access these files to retrieve the values of their configuration parameters.

If certain configuration parameters have incorrect values, then the applications may exhibit an undesired behavior. For example, if the value of a home page configuration parameter is not set correctly, then when the browser application starts, it will exhibit an undesired behavior by not displaying a home page or displaying the wrong home page. If a configuration parameter incorrectly indicates a certain text editor should be invoked to process a graphics file, then the undesired behavior will be the incorrect display of the graphics content.

Because of the complexity of applications and their large number of configuration parameters, it can be very time-consuming to troubleshoot which configuration parameters are at fault for causing an application to exhibit the undesired behavior. Most users of personal computers have difficulty performing this troubleshooting. As a result, users typically rely on technical support personnel to assist in the troubleshooting. This troubleshooting not only is expensive but also users may experience a significant productivity loss as a result of their inability to effectively use an application that is exhibiting an undesired behavior.

Typically, technical support personnel use an ad hoc approach to troubleshooting configuration problems. Because some central registries store over 200,000 configuration parameters and some computer systems have over 100,000 files, the personnel using knowledge gained from experiencing similar problems will try to narrow in on the at-fault configuration parameter. This ad hoc approach can take a considerable amount of time and even longer if it is a combination of configuration parameters whose values are incorrect. In some cases, the technical support personnel may compare the values of the configuration parameters to "ideal" values for that application. It can be very difficult to identify the configuration parameters used by an application, and this identification requires application-specific knowledge. Moreover, because of the large number of configuration parameters available and the large number of possible values for each configuration parameter, many of the configuration parameters will have no "ideal" value. Thus, technical support personnel still need to review those values of the application that are different from the ideal values.

It would be desirable to automatically identify a configuration parameter that is at fault for causing an application to exhibit an undesired behavior. It would also be desirable, after such a configuration parameter is identified, to identify an appropriate value for that configuration parameter.

SUMMARY

A method and system for identifying a likely cause of a component (e.g., application or hardware device) to exhibit a certain behavior is provided. A system collects values for configuration information (e.g., configuration parameters of an application) that may be causing certain behavior and retrieves values for the configuration information from other occurrences of that component (e.g., other computer systems that host the same application). The collected values may be for all the configuration information or a subset of the configuration information that is actually accessed by the component when the certain behavior was exhibited. The system then performs a statistical analysis over the collected values and the retrieved values to determine which configuration information is likely causing the certain behavior of the component.

BRIEF DESCRIPTION OF THE DRAWINGS

FIG. 8 is a display page that illustrates the results of the troubleshooting engine.

DETAILED DESCRIPTION

Figure 1:
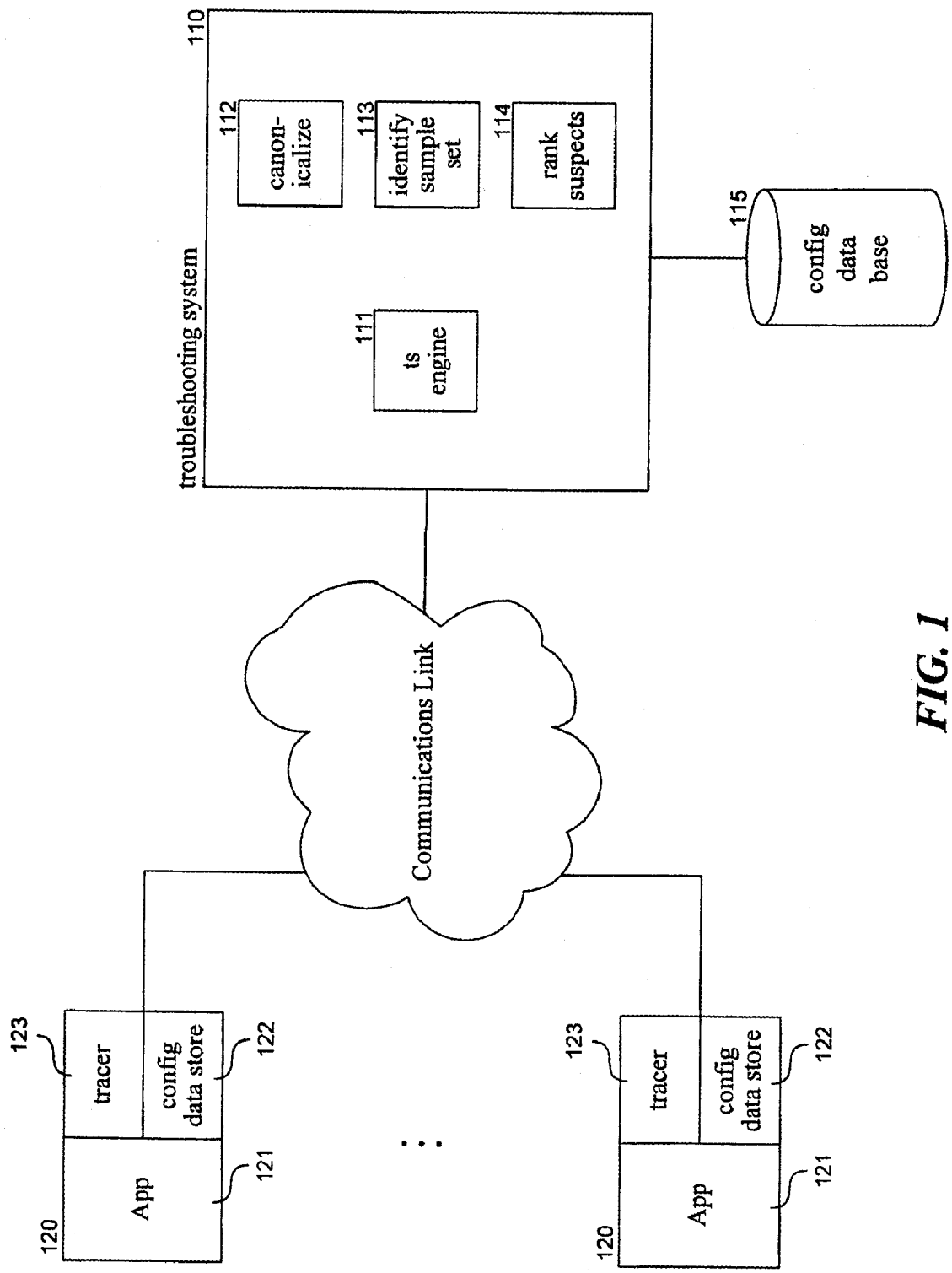
FIG. 1 is a block diagram that illustrates components of the troubleshooting system in one embodiment.

A method and system for identifying a configuration parameter of a "sick" computer system that is at fault for causing an undesired behavior based on analysis of configuration parameters from other computer systems is provided. In one embodiment, a troubleshooting system collects "suspect" values for "suspect" configuration parameters used by a "sick" application when the undesired behavior was exhibited by the sick computer system. The troubleshooting system then compares the suspect values to sample values of the suspect configuration parameters retrieved from sample computer systems that may be peer computer systems. The troubleshooting system uses that comparison to identify one or more suspect configuration parameters that are likely at fault for causing the application to exhibit the undesired behavior. For example, if a suspect configuration parameter has a value that indicates a different text editor should be used to process a graphics file, but the corresponding sample values for all the sample computer systems indicate a certain picture editor should be used, then that suspect configuration parameter might be at fault for causing a graphics file to be displayed incorrectly. This might be especially true if the values for all other suspect configuration parameters are the same for the sick computer system and the sample computer systems. The troubleshooting system may apply various statistical analysis techniques to the sample values when identifying the suspect configuration parameter that is likely at fault. For example, Bayes' rule can be applied to derive a probability for each suspect configuration parameter indicating its likelihood of being at fault. Once a likely at-fault suspect configuration parameter has been identified, the troubleshooting system can identify likely correct values based on analysis of the sample values. Thus, the troubleshooting system may be considered to use the "typical" sample value as the "ideal" value for an at-fault configuration parameter. In this way, the troubleshooting system can quickly and automatically identify the configuration parameter that is likely at fault and propose a sample value that may be correct.

In one embodiment, the troubleshooting system identifies the suspect configuration parameters by monitoring the execution of the application when it exhibits the undesired behavior. A tracer program may be used to trace the application's access to the configuration parameters that may be stored in a configuration file for the application or in a central registry. The tracer program logs the configuration parameters accessed by the application and their corresponding values. The logged configuration parameters are considered the "suspect" configuration parameters because they are the ones that the application used when it exhibited the undesired behavior. The tracer program may execute on the sick computer system and then provide its log to a troubleshooting computer system for identification of the suspect configuration parameter that is at fault.

The troubleshooting system can retrieve the sample values for configuration parameters from the sample computer systems before or after the suspect values for the sick computer system are collected. The sample computer systems may be "peer" computer systems in the sense that they are related in some way. For example, the peer computer systems can be the set of user computer systems on the local area network of a company or a subset that shares a common characteristic (e.g., used by sales representatives). If the sample values are retrieved before the suspect values are collected, the troubleshooting system may store the sample values in a configuration database. The configuration database may have, for each peer computer system, an entry that contains the value of each configuration parameter retrieved from that computer system. In addition, the troubleshooting system may maintain an index of which peer computer systems have which applications installed. The troubleshooting system may use the index to rapidly select as the sample computer systems those peer computer systems that have the sick application installed. The troubleshooting system uses the sample values of the suspect configuration parameters in its analysis. When the sample values are retrieved before the suspect values are collected, the configuration parameter values for as many different applications that can be troubleshot need to be retrieved and stored. In addition, these sample values may need to be retrieved periodically to reflect the then-current configuration of the sample computer systems.

If the sample values are retrieved after the suspect values are collected, then the troubleshooting system can limit the retrieval of values to those of the suspect configuration parameters as identified by the tracer program. Because the retrieval is performed at the time of the analysis, the sample values represent the then-current values of the suspect configuration parameters. To speed up the retrieval of the sample values, the troubleshooting system may maintain an index of which peer computer systems have the sick application installed. The troubleshooting system can use the index to identify those peer computer systems that have the sick application installed and retrieve the values for the suspect configuration parameters from only those computer systems.

In one embodiment, the troubleshooting system may pre-process various configuration parameters to place them in a canonical or normal form. Some configuration parameters may have names or values that are system-specific (e.g., different for every peer computer system). Such system-specific configuration parameters may include password parameters, user name/ID parameters, machine name parameters, device ID parameters, and so on. The troubleshooting system may set the value of each of these parameters to a canonical form, such as "username" for a user name parameter. Alternatively, the troubleshooting system may simply disregard the system-specific configuration parameters when performing its analysis. Other configuration parameters may have values that need to be normalized. For example, a configuration parameter with a URL as its value may be case-insensitive, in which situation the troubleshooting system may normalize values to a standard case to assist in identifying which values are the same (i.e., reference the same resource). As another example, the value of a number in single quotes (e.g., '1') and in double quotes ("1") may represent the same behavior to the application. In such a situation, the troubleshooting system may replace all double quotes with single quotes to normalize the values. The troubleshooting system may place both the suspect values and the sample values in a canonical or normal form.

One skilled in the art will appreciate that many different mathematical analysis techniques may be used to identify the at-fault configuration parameter. Those techniques may include a nearest neighbor analysis, a Bayes net, a neural network, a decision tree, a support vector machine, and so on. In one embodiment, the troubleshooting system calculates a probability that each suspect configuration parameter is at fault using Bayes' rule as described below in more detail.

FIG. 1 is a block diagram that illustrates components of the troubleshooting system in one embodiment. The troubleshooting system 110 is connected to computer systems 120 via a communications link 130. The troubleshooting system includes a troubleshooting engine 111, a canonicalize component 112, an identify sample set component 113, and a rank suspects component 114. The troubleshooting system also includes a configuration database 115. Each peer computer system includes one or more applications 121, a configuration data store 122, and a tracer program 123. In operation, when a sick application is identified, the tracer program is run on that computer system to log the suspect configuration parameters that the application accesses from the configuration data store. The tracer program may then provide that log to the troubleshooting system via the communications link 130. When the troubleshooting system receives the suspect configuration parameters and their values, it invokes the troubleshooting engine. The troubleshooting engine invokes the canonicalize component to place the values of system-specific configuration parameters in a canonical form and the values of other configuration parameters in a normal form. The troubleshooting engine then invokes the identify sample set component. The identify sample set component identifies the peer computer systems whose values for the suspect configuration parameters are to be used in identifying the at-fault suspect configuration parameter. The identify sample set component may use an index to identify which peer computer systems have the sick application installed and are thus eligible to be a sample computer system. As described above, the identify sample set component may retrieve the sample values from the configuration database or may dynamically retrieve the sample values from some sample computer systems. After the sample values are retrieved, the troubleshooting engine invokes the rank suspects component. The rank suspects component performs a Bayes' rule analysis to calculate a probability that each suspect configuration parameter is at fault and then ranks the suspect list based on this probability. The top-ranking configuration parameter is most likely at fault.

The computing devices on which the troubleshooting system may be implemented include a central processing unit, memory, input devices (e.g., keyboard and pointing devices), output devices (e.g., display devices), and storage devices (e.g., disk drives). The memory and storage devices are computer-readable media that may contain instructions that implement the troubleshooting system. In addition, data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the troubleshooting system may be implemented. The operating environment is only one example of a suitable operating environment and is not intended to suggest any limitation as to the scope of use or functionality of the troubleshooting system. Other well-known computing systems, environments, and configurations that may be suitable for use include personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The troubleshooting system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The term "application" refers to any type of executing software such as drivers, kernel-mode code, operating systems, system utilities, web servers, database servers, and so on. The functions of the troubleshooting system can be performed by each peer computer system or by a central troubleshooting computer system, or distributed between the peer computer systems and a central troubleshooting system.

TABLE 1

| Name | Suspect | Sample1 | Sample2 | Sample3 | Sample4 | Sample5 |
|---|---|---|---|---|---|---|
| .jpg/contentType | image/jpeg | image/jpeg | image/jpeg | image/jpeg | image/jpeg | image/jpeg |
| .htc/contentType | null | text/x-comp | text/x-comp | text/x-comp | text/x-comp | text/x-comp |
| url-visited | yahoo | hotmail | Nytimes | SFGate | google | friendster |

Table 1 illustrates an example of a troubleshooting case. The table shows suspect values and sample values for various suspect configuration parameters. The tracer program logged the suspect configuration parameters and their suspect values when the application exhibited an undesired behavior. In this example, the tracer program identified three configuration parameters as being suspect (e.g., ".jpg/contentType"). The troubleshooting system retrieved sample values from five sample computer systems for each suspect configuration parameter. Analysis of the sample values indicates that the most likely at-fault configuration parameter is the second configuration parameter (i.e., ".htc/contentType") in the table. All the sample values for that configuration parameter are the same (i.e., "text/x-comp"), but different from the suspect value ("null"). Therefore, it might be assumed that the suspect value of the second configuration parameter is incorrect. Since the suspect value and all the sample values of the first configuration parameter are the same, the suspect value is probably correct. Moreover, because the suspect value and all the sample values for the third configuration parameter are completely different, it would be difficult to assess the correctness of the suspect value from the sample values. In addition to identifying that the second configuration parameter may be at fault, the correct value can be inferred as being the common sample value (i.e., "text/x-comp").

Table 1 illustrates two different types of configuration parameters: configuration state and operational state. The first and second parameters are configuration states, and the third parameter is an operational state. Operational state parameters have values that are typically set by the application itself and include timestamps, usage counts, caches, seeds for random number generators, window positions, most recently used related information, and so on. The configuration state parameters can generally be set by users to control the operation of an application and are thus more likely than operational state parameters to be at fault for causing an undesired behavior of an application.

TABLE 2

| | |
|---|---|
| N | Number of sample computer systems |
| t | Number of suspect configuration parameters |
| i | Index of the suspect configuration parameters (from 1 to t) |
| V | Value of a suspect configuration parameter |
| c | Number of possible values for a suspect configuration parameter |
| m | Number of sample values that match the suspect value |
| P(S) | Prior probability that a suspect configuration parameter is at fault (i.e., "S" for sick) |
| P(H) | Prior probability that a suspect configuration parameter is not at fault (i.e., "H" for healthy) |
| P(S\|V) | Probability that a suspect configuration parameter that is at fault has the value V |
| P(V\|S) | Probability that a suspect configuration parameter with a value V is at fault |
| P(V\|H) | Probability that a suspect configuration parameter with the value V is not at fault |

In one embodiment, the troubleshooting system uses Bayes' rule in calculating a probability that each suspect configuration parameter is at fault. Bayes' rule can be stated as follows:

$$P(S \mid V) = \frac{P(V \mid S)P(S)}{P(V \mid S)P(S) + P(V \mid H)P(H)} \qquad (1)$$

Table 2 contains a description of the terms used in the equation. To simplify the equations, the index i for the suspect configuration parameters has been omitted from these equations (e.g., $P_i(S \mid V_i)$ is represented as $P(S \mid V)$). If there is only one at-fault suspect configuration parameter and all the suspect configuration parameters have an equal prior probability of being at fault, then $$P(S) = \frac{1}{t} \qquad (2)$$

$$P(H) = 1 - \frac{1}{t} \qquad (3)$$

If all the possible values of a suspect configuration parameter have an equal prior probability of being at fault, then $$P(V \mid S) = \frac{1}{c} \qquad (4)$$

As an example, if a configuration parameter can have the values of red, green, or blue, then it has three unique sample values. The troubleshooting system can calculate the cardinality by counting the number of unique sample values for a suspect configuration parameter (including a null value if that occurs) and adding one to account for all possible values that do not occur in the sample set. In this example, the cardinality is 4 (i.e., 3+1). Thus, the prior probability of Equation 4 is ¼.

The probability that a suspect value of a suspect configuration parameter is not at fault can be derived from the sample values. In particular, the probability can be assumed to be the number of times the suspect value occurs in the sample values divided by the number of values. The maximum likelihood of this probability is given by the following equation:

$$P(V \mid H) = \frac{m}{N} \qquad (5)$$

Substituting equations (2)-(5) into equation (1) results in the following equation:

$$P(S \mid V) = \frac{N}{N + cm(t-1)} \qquad (6)$$

The maximum likelihood, however, may have undesirable properties when the number of sample computer systems is limited. For example, when there are no matching values to V in the sample values, then m=0 and P(S|V)=1, which expresses complete certainty that is unjustified. For example, in Table 1, the maximum likelihood would indicate that the second and third configuration parameters are both at fault with complete and equal confidence. Bayesian estimation of probabilities may be more appropriate when the number of samples is small. Bayesian estimation uses a prior estimate of P(V|H) before the sample values are examined and produces a posterior estimate of P(V|H) after the sample values are examined. Therefore, P(V|H) is never 0 or 1.

If it is assumed that P(V|H) is multinomial over all possible values V, the multinomial has parameters $p_j$. Each $p_j$ is the probability that the value $V_j$ occurs and $$\Sigma p_j = 1 \qquad (7)$$

The probabilities have prior and posterior values $p_j$ that can be represented in a Dirichlet distribution. Dirichlet distributions are conjugate to multinomials. That is, combining observations from a multinomial with a prior Dirichlet yields a posterior Dirichlet.

Dirichlet distributions are characterized by a count vector $n_j$, which corresponds to the number of possible counts for each value $V_j$. To perform Bayesian estimation of P(V|H), a prior set of counts $n'_j$ that reflects a prior belief about the likelihood of various values $V_j$ is used. The count $m_j$ for each unique value from the sample values can be collected and the mean of the posterior Dirichlet yields the posterior estimate of the following equation:

$$P(V_j \mid H) = \frac{m_j + n'_j}{N + \sum_j n'_j} \qquad (8)$$

Since this probability is only needed for the suspect value, $m_j$ can be replaced with m, the number of samples that matches the suspect entry. Furthermore, if it is assumed that all values $V_j$ have the same a priori probability, then $n'_j$ can be replaced with some value n and the sum $\Sigma_j n'_j$ can be replaced with cn. These assumptions result in the following equation:

$$P(S \mid V) = \frac{N + cn}{N + cnt + cm(t-1)} \qquad (9)$$

The parameter n is proportional to the number of sample values that is required to overwhelm the prior and to move the estimated P(V|H) probabilities away from the estimated probability that $p_j$ is 1/c. The parameter n indicates the strength of the prior. In other words, the higher n is the less confidence is placed in the sample values. A higher n leads to a stronger prior, which requires more evidence (i.e., samples) to change the posterior. If n=1 is selected for a prior, which is equivalent to a flat prior, then all multinomial values $p_j$ are equally likely a priori. This is known as an "uninformative" prior.

Figure 2:
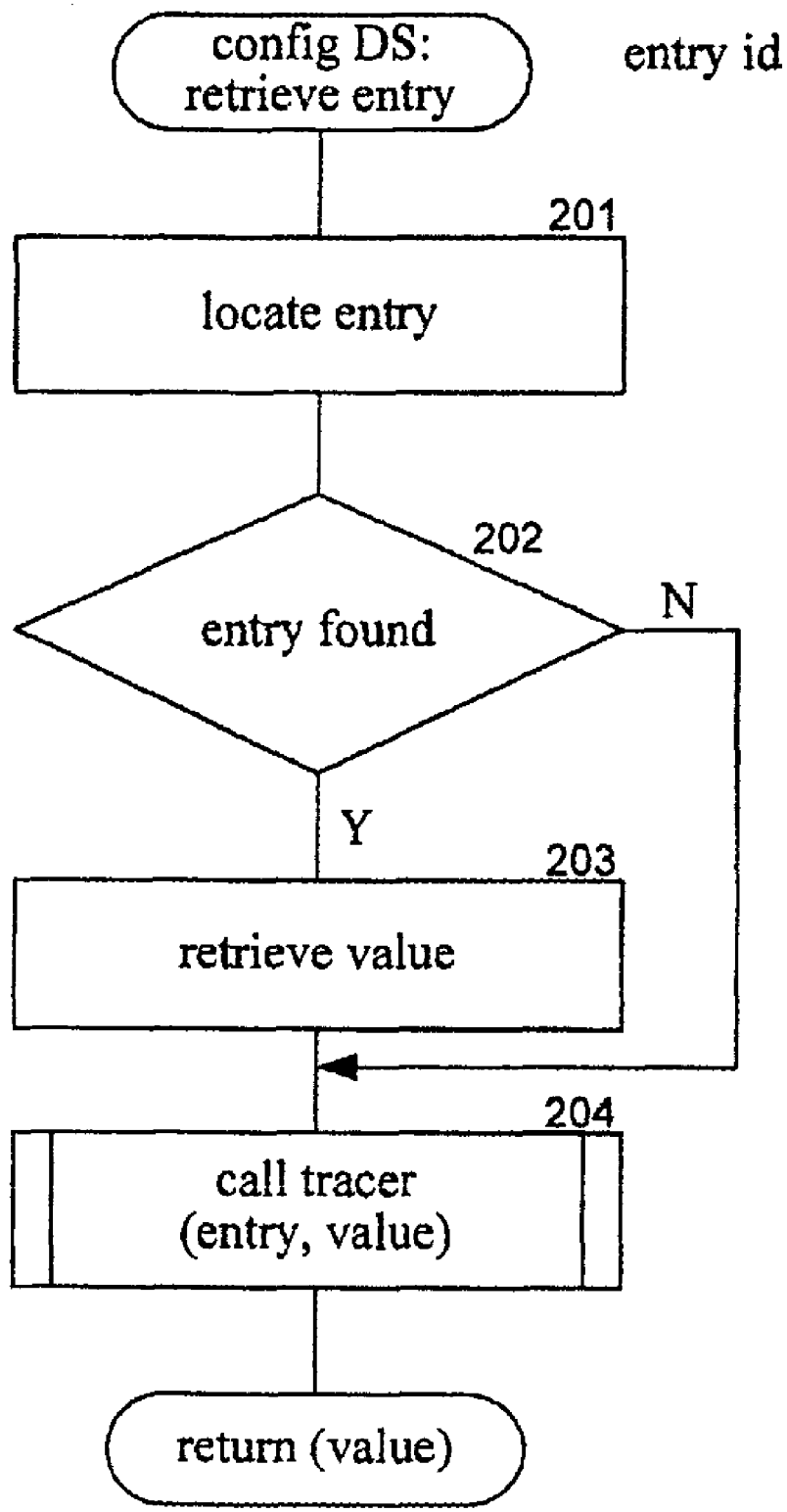
FIG. 2 is a flow diagram that illustrates processing of the tracer function in one embodiment.
Figure 3:
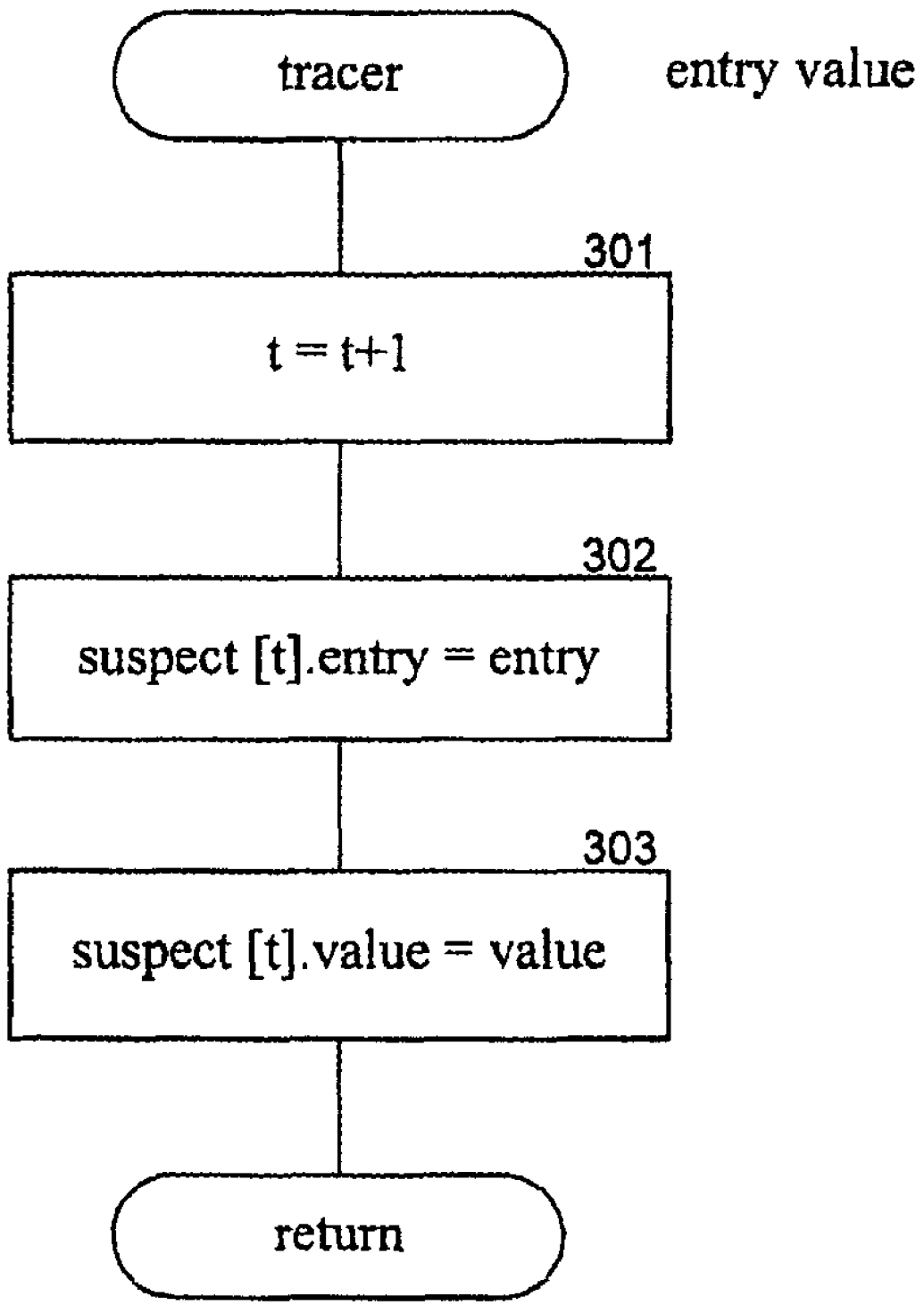
FIG. 3 is a flow diagram that illustrates processing of the tracer function in another embodiment.

FIGS. 2 and 3 are flow diagrams that illustrate processing of a configuration parameter retrieving function and a tracer function in one embodiment. FIG. 2 is a flow diagram that illustrates processing of a function that is invoked by the sick application to retrieve a value for a configuration parameter from the configuration data store. The function is passed an identifier of the configuration parameter to be retrieved. In block 201, the function locates in the configuration data store the entry for the identified configuration parameter. In decision block 202, if the entry is located, then the function continues at block 203, else the function continues at block 204. In block 203, the function retrieves the value for the identified configuration parameter. In block 204, the function invokes a tracer function passing the identification of the configuration parameter and the retrieved value. If the configuration parameter was not located, then the value may be null. The function then returns the retrieved value to the sick application. This function may be implemented as part of an application programming interface of the configuration data store.

FIG. 3 is a flow diagram that illustrates processing of the tracer function in one embodiment. The function is passed an identifier of the configuration parameter and its value. The function logs the passed identifier and value. In block 301, the function increments the number of configuration parameters that have been retrieved. In one embodiment, the function may log only one value for each configuration parameter. If the sick application accesses the same configuration parameter multiple times, this function may log the last configuration parameter and value pair. In such a case, this function would need to check for duplicate accesses to a configuration parameter and increment the number of configuration parameters only when a duplicate is not found. In block 302, the function stores the suspect configuration parameter identifier. In block 303, the function stores the suspect configuration parameter value and then returns.

Figure 4:
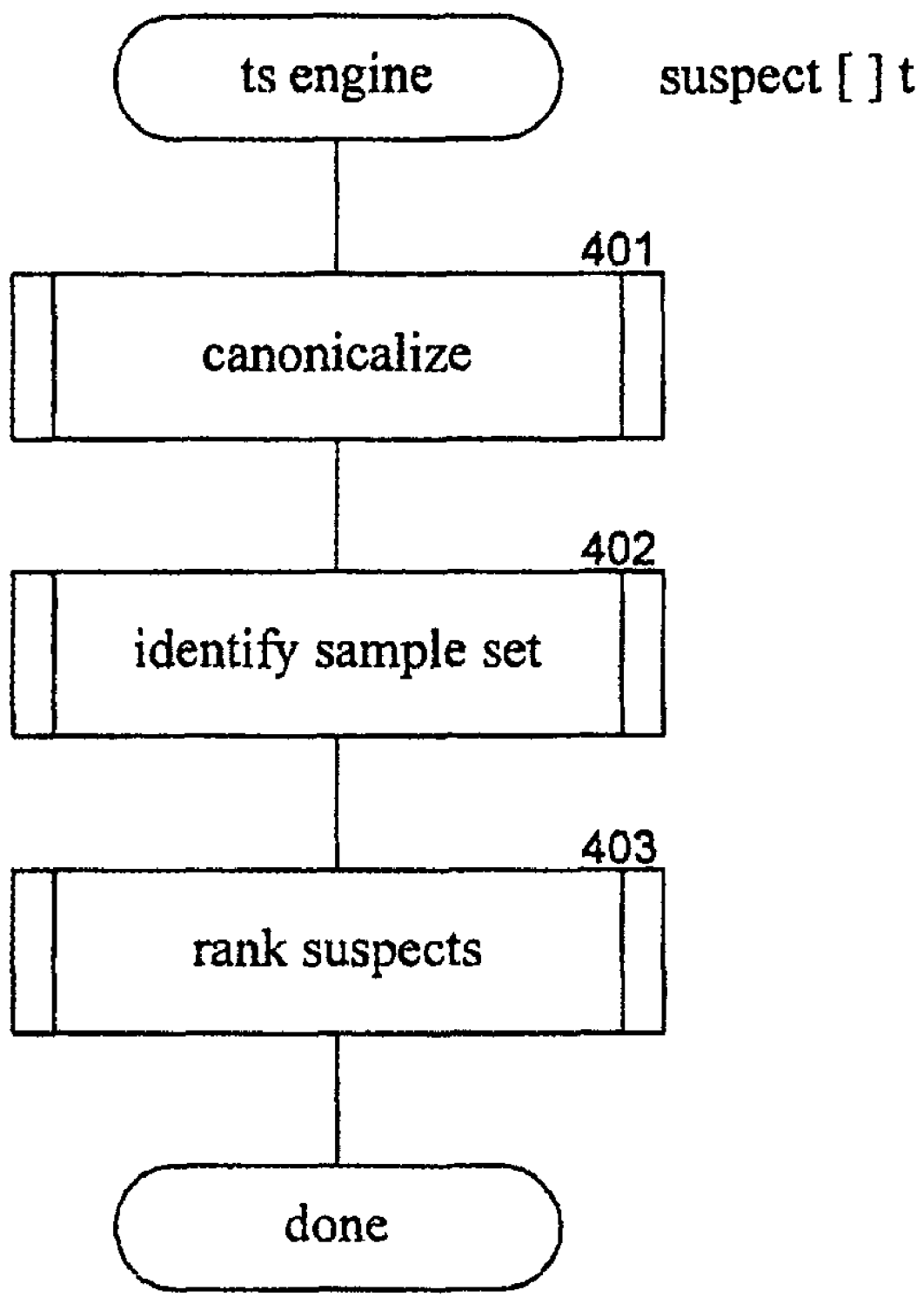
FIG. 4 is a flow diagram that illustrates processing of the troubleshooting engine in one embodiment.

FIGS. 4-7 are flow diagrams that illustrate processing of the troubleshooting system in one embodiment. FIG. 4 is a flow diagram that illustrates processing of the troubleshooting engine in one embodiment. The troubleshooting engine receives the values for the suspect configuration parameters from the sick computer system hosting the sick application. In block 401, the engine invokes the canonicalize component passing the suspect configuration parameter identifiers and their values. In block 402, the engine invokes the identify sample set component passing an identifier of the sick application and the suspect configuration parameter identifiers and receiving the sample values in return. In block 403, the engine invokes the rank suspects component passing the suspect values and sample values and receiving a ranking of the suspect values based on the probability that each suspect value is at fault. The rank suspects component calculates the probability based on Equation 9. The engine then completes.

Figure 5:
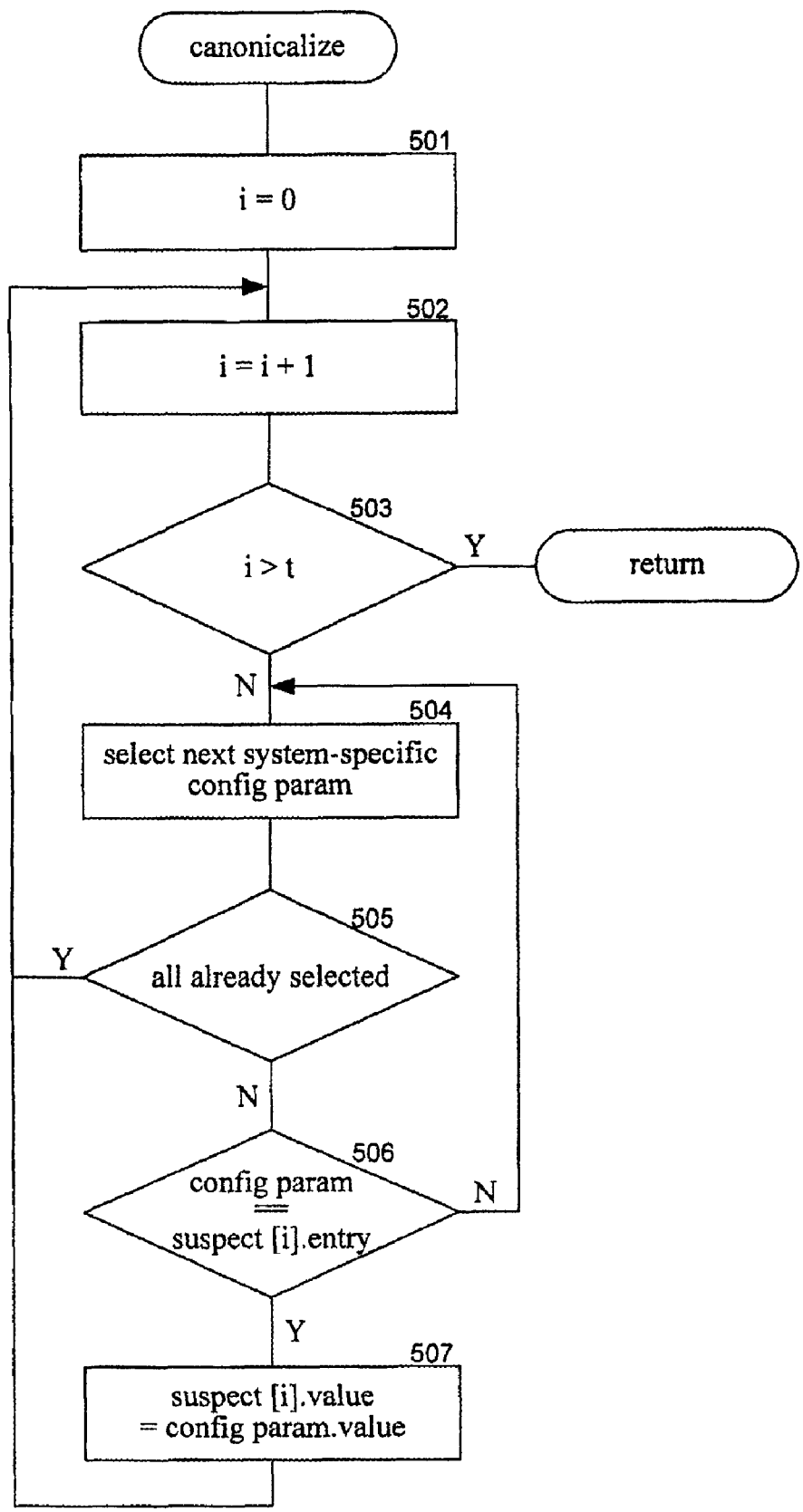
FIG. 5 is a flow diagram that illustrates processing of the canonicalize component in one embodiment.

FIG. 5 is a flow diagram that illustrates processing of the canonicalize component in one embodiment. The component is passed the suspect configuration parameter identifiers and their values. The component canonicalizes the suspect values of the system-specific configuration parameters. The component can also be adapted to normalize the suspect values. In block 501, the component initializes an index into an array of suspect configuration parameters. In blocks 502-507, the component loops processing each suspect configuration parameter. In block 502, the component selects the next suspect configuration parameter. In block 503, if all the suspect configuration parameters have already been selected, then the component returns, else the component continues at block 504. In block 504, the component selects the next system-specific configuration parameter. In decision block 505, if all the system-specific configuration parameters have already been selected, then the component loops to block 502 to select the next suspect configuration parameter, else the component continues at block 506. In block 506, if the selected system-specific configuration parameter is the same as the selected suspect configuration parameter, then the component continues at block 507, else the component loops to block 504 to select the next system-specific configuration parameter. In block 507, the component sets the value of the selected suspect configuration parameter to the canonical value for the selected system-specific configuration parameter and then loops to block 502 to select the next suspect configuration parameter.

Figure 6:
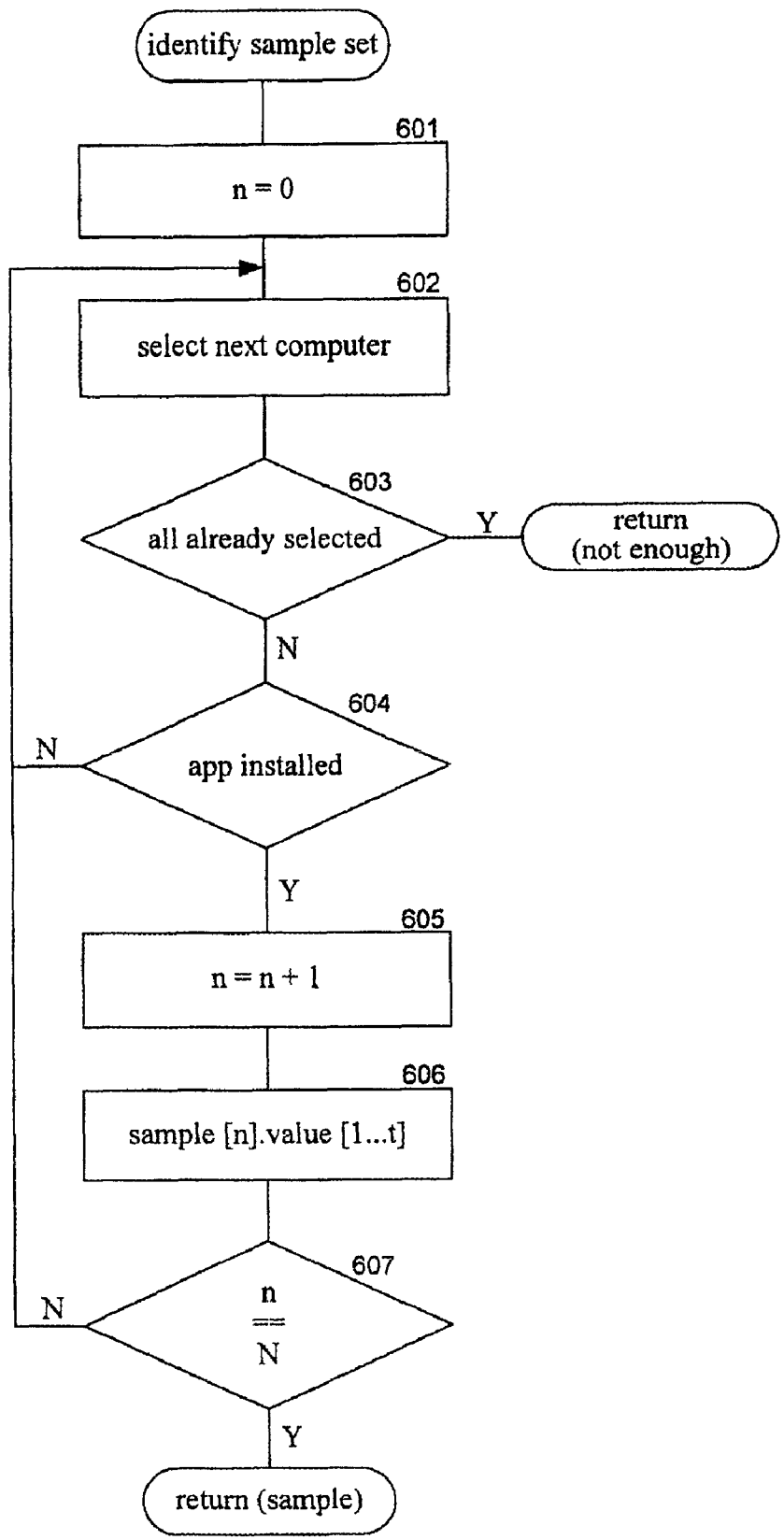
FIG. 6 is a flow diagram that illustrates processing of the identify sample set component in one embodiment.

FIG. 6 is a flow diagram that illustrates processing of the identify sample set component in one embodiment. The component is passed an indication of the sick application and the suspect configuration parameters. In this embodiment, the component accesses the sample configuration database containing sample values that have been previously retrieved from peer computer systems. As part of the retrieval process, the troubleshooting system may have placed the sample values in a canonical or normal form, for example, using the canonicalize component of FIG. 5. In block 601, the component initializes an index of the sample computer systems. In blocks 602-607, the component loops identifying sample computer systems until a designated number have been identified. In block 602, the component selects the next peer computer system from the sample configuration database. In decision block 603, if all the peer computer systems have already been selected, then the component returns an indication that not enough sample computer systems have been found, else the component continues at block 604. In decision block 604, if the sick application is installed on the selected peer computer system, then it is a sample computer system and the component continues at block 605, else the component loops to block 602 to select the next peer computer system. In block 605, the component increments the index of the sample computer systems that have been identified. In block 606, the component retrieves the sample value for each suspect configuration parameter for the selected peer computer system. In decision block 607, if enough sample computer systems have been identified, then the component returns the sample values, else the component loops to block 602 to select the next peer computer system.

Figure 7:
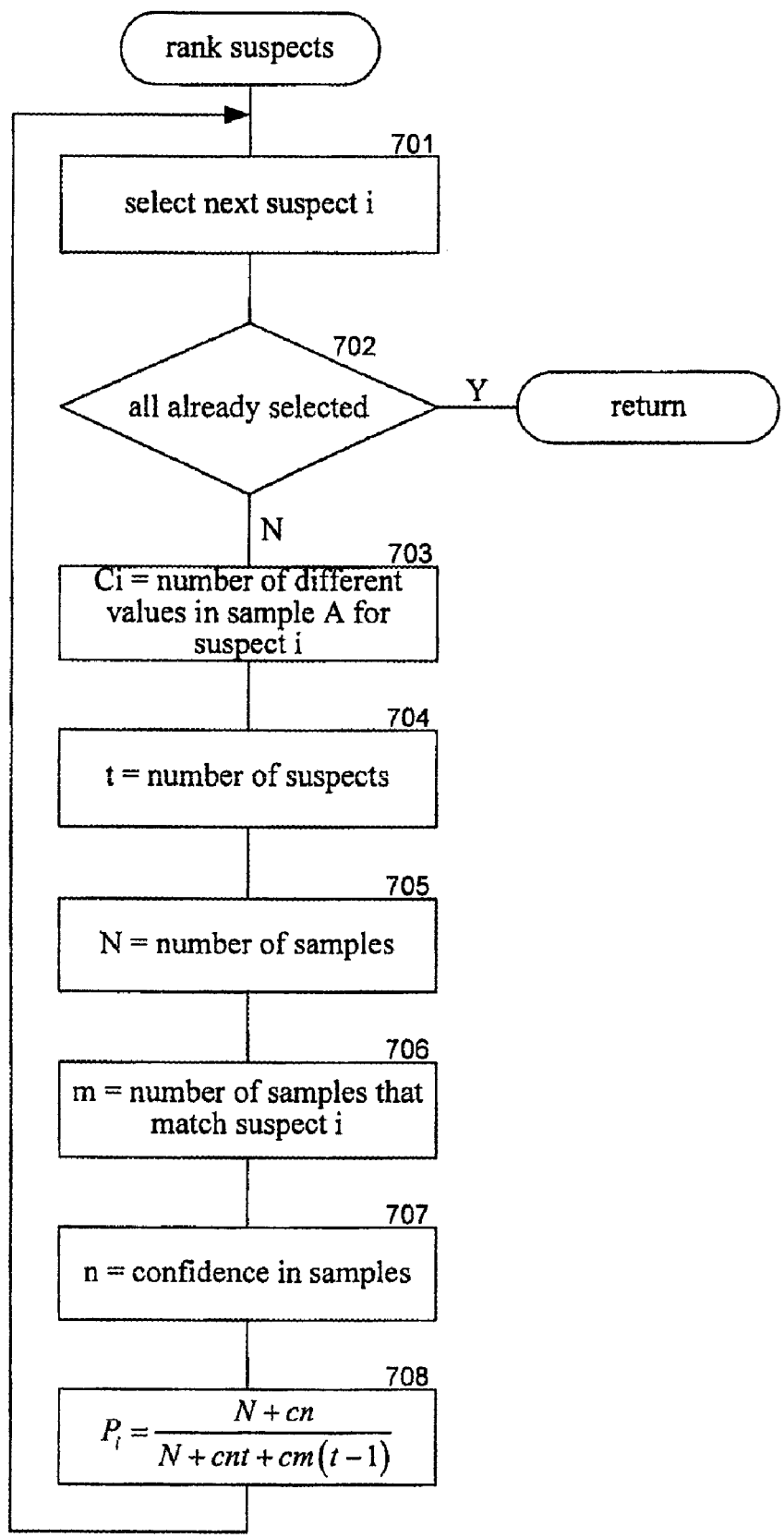
FIG. 7 is a flow diagram that illustrates processing of the rank suspects component in one embodiment.

FIG. 7 is a flow diagram that illustrates processing of the rank suspects component in one embodiment. The component is passed the suspect values and the sample values. The component returns a probability that each suspect configuration parameter is at fault and may return an indication of a possible correct value for the configuration parameters with the highest probabilities. In blocks 701-708, the component loops selecting each suspect configuration parameter and calculating the probability that it is at fault. In block 701, the component selects the next suspect configuration parameter i. In block 702, if all the suspect configuration parameters have already been selected, then the component returns, else the component continues at block 703. In block 703, the component counts the number of different values $c_i$ in the samples for the selected suspect configuration parameter. The troubleshooting system may calculate and store this count when the configuration parameters are retrieved from the peer computer system. In block 704, the component sets the number of suspect configuration parameters t, which may be received from the sick computer system. In block 705, the component sets the number of samples N, which may be derived from the identify sample set component. In block 706, the component sets the number of sample values of the selected suspect configuration parameter that matches the suspect value $m_{ij}$. The troubleshooting system may also calculate and store the number of occurrences of each sample value for each configuration parameter retrieved from the peer computer systems. In block 707, the component sets an indicator of the confidence n that the system has in the samples. In block 708, the component calculates the probability for the suspect configuration parameter P(S|V) using Equation 9 and loops to block 701 to select the next suspect configuration parameter.

FIG. 8 is a display page that illustrates the results of the troubleshooting engine. This display page may be displayed by the sick computer system to assist a user in correcting the at-fault configuration parameter. The display page includes a table 801 that has a row for each suspect configuration parameter. Each row includes the identification of the suspect configuration parameter, the probability that that suspect configuration parameter is at fault, the suspect value of that suspect configuration parameter, and sample values that may be correct. Those sample values may be the most popular of the sample values. The display page also includes button 802 for updating the value of a suspect configuration parameter. When a user selects a sample value for one or more suspect configuration parameters and then selects the update button, the system changes the values of the suspect configuration parameters in the configuration data store on the sick computer system to the selected values. The user can then execute the application to determine whether it still exhibits the undesired behavior. If so, the user can select the reset button 803 to reset the suspect configuration parameters to their suspect values. The user can repeat this process for various combinations of suspect configuration parameters and their values until the application no longer exhibits the undesired behavior.

One skilled in the art will appreciate that although specific embodiments of the troubleshooting system have been described for purposes of illustration, various modifications may be made without deviating from the spirit and scope of the invention. The troubleshooting system can also be used to identify hardware configuration problems. For example, if the peer computer systems include special-purpose signal processing hardware with configuration parameters, then suspect values of those configuration parameters for a computer system that is exhibiting an undesired behavior can be compared to sample values as described above. More generally, the troubleshooting system can be used in an environment with multiple configuration parameters, such as settings for television set-top boxes, cell phones, automobiles, and so on. The techniques of the troubleshooting system can also be used to identify information generally that may be causing a certain behavior, whether desired or undesired. For example, the execution of an application may be adversely affected by the overall configuration of the computer system on which it is executing. As an example, the undesired behavior may be caused by a missing operating system component, an outdated driver, insufficient main memory, interactions with a user, URL parameters, API parameters, and so on. The techniques of the troubleshooting system can be used to analyze such information collected from sample systems to identify the cause of the behavior. The techniques can also be used to identify the cause of a desired behavior. For example, a complex system may have hundreds of "parameters" with many different possible values that may affect its behavior. In such a case, it may be impractical to predict the behavior of each possible combination of parameter values. However, once a desired behavior is identified, the technique can be used to identify the parameters and their values that are likely causing the desired behavior by comparing it to a sample set that is not exhibiting that behavior (or even one that is exhibiting that behavior). The described technology is related to U.S. Provisional Application No. 60/545,799, entitled "Friends Troubleshooting Network: Towards Privacy-Preserving, Automatic Troubleshooting" and filed on Feb. 19, 2004, and U.S. Provisional Application No. 60/547,607, entitled "Method and System for Collecting Information from Computer Systems based on a Trusted Relationship" and filed on Feb. 24, 2004, which are hereby incorporated by reference. These applications describe technology that can be used to retrieve the sample configuration parameter values. Accordingly, the invention is not limited except by the appended claims.

We claim:

1. A method in a computer system for identifying a configuration parameter that is likely causing a component of a computing device to exhibit an undesired behavior, the method comprising:

collecting suspect values for suspect configuration parameters of the component;

providing sample values for the suspect configuration parameters for the component, the sample values being retrieved from other computing devices having the component; and comparing the suspect values with the sample values to identify a suspect configuration parameter whose suspect value is likely to be causing the component of the computing device to exhibit the undesired behavior;

wherein the collecting includes running a program that intercepts and records accesses by the component to a configuration data store; and wherein the configuration data store is a registry file.

2. The method of claim 1 wherein the comparing includes calculating a probability for each suspect configuration parameter.

3. The method of claim 1 wherein the suspect values are collected during execution of the component in which the undesired behavior was exhibited.

4. The method of claim 1 wherein the providing of values includes retrieving the sample values for the suspect configuration parameters from each sample component.

5. The method of claim 4 wherein the retrieving of the sample values is performed before the collecting of the suspect values wherein the sample values are retrieved for configuration parameters that include the suspect configuration parameters.

6. The method of claim 4 wherein the retrieving of the sample values is performed after collecting the suspect values.

7. The method of claim 1 wherein the component is software.

8. The method of claim 1 wherein an index is maintained that indicates computing devices that have the component installed.

9. The method of claim 1 wherein the values for configuration parameters are placed in a normal form.

10. The method of claim 1 wherein the component is a hardware device.

11. The method of claim 1 including aggregating the sample values prior to collecting the suspect values to facilitate comparing to the suspect values.

12. The method of claim 11 wherein the aggregating includes counting the number of distinct sample values for each suspect configuration parameter.

13. The method of claim 12 wherein the aggregating includes counting the number of sample components that have each distinct value.

14. The method of claim 1 including identifying a likely correct value for the sample configuration parameter that is identified as likely causing the component to exhibit the undesired behavior.

15. The method of claim 14 including changing the suspect value of the suspect configuration parameter that is identified as likely causing the component to exhibit the undesired behavior to the identified likely correct value.

16. The method of claim 14 including presenting to a user an indication of likely correct values for the suspect configuration parameter that is identified as likely causing the component to exhibit the undesired behavior.

17. The method of claim 14 including presenting to a user a ranking of suspect configuration parameters that may be causing the component to exhibit the undesired behavior.

18. A method in a computer system for identifying a configuration parameter that is likely causing a component of a computing device to exhibit an undesired behavior, the method comprising:
  collecting suspect values for suspect configuration parameters of the component;
  providing sample values for the suspect configuration parameters for the component, the sample values being retrieved from other computing devices having the component; and
  comparing the suspect values with the sample values to identify a suspect configuration parameter whose suspect value is likely to be causing the component of the computing device to exhibit the undesired behavior;
  wherein the collecting includes running a program that intercepts and records accesses by the component to a configuration data store; and
  wherein the configuration data store is a resource file.

19. A computer-readable storage medium containing instructions for controlling a troubleshooting system to retrieve sample values for suspect configuration parameters of an application, by a method comprising:
  identifying suspect configuration parameters of the application by monitoring the execution of the application on a computing device, the computing device having peer computing devices, the identifying of suspect configuration parameters including executing a tracer program that tracks accesses of the application of the computing device to configuration parameters;
  maintaining an index of which peer computing devices have which applications installed;
  identifying as sample computing devices the peer computing devices with the same application installed as indicated by the index; and
  retrieving sample values for the identified configuration parameters from the identified sample computing devices for use in identifying a suspect configuration parameter that is likely causing the application executing on the computing device to exhibit an undesired behavior.

20. The computer-readable medium of claim 19 including, before identifying the suspect configuration parameters, collecting sample values for configuration parameters of applications installed on the sample computing devices and storing the sample values in a data store wherein the retrieving of the sample values includes retrieving the sample values from the data store after the suspect configuration parameters are identified.

21. The computer-readable medium of claim 19 wherein the retrieving includes dynamically collecting the sample values from the sample computing devices.

22. The computer-readable medium of claim 19 including comparing a value of a suspect configuration parameter to the sample values of the suspect configuration parameter to identify whether the suspect configuration parameter is likely causing the computing device to exhibit the undesired behavior.

23. A computer-readable storage medium containing instructions for controlling a troubleshooting system to identify a configuration parameter that is likely causing a component of a computer system to exhibit an undesired behavior, by a method of:
  providing sample values of configuration parameters for sample components, the sample values of configuration parameters for a sample component being retrieved from other computer systems having the sample components;
  receiving suspect values for suspect configuration parameters of the component that is exhibiting the undesired behavior; and
  identifying a suspect configuration parameter whose suspect value as likely causing the component to exhibit the undesired behavior by comparing the suspect values of the suspect configuration parameters to the sample values of the suspect configuration parameters;
  wherein the received suspect values are collected by running a program that intercepts and records accesses by the component to a configuration data store, and
  wherein the configuration data store is a registry file.

24. The computer-readable medium of claim 23 wherein the comparing includes calculating a probability for each suspect configuration parameter.

25. The computer-readable medium of claim 23 wherein the suspect values are collected during execution of the component in which the undesired behavior was exhibited.

26. The computer-readable medium of claim 23 including aggregating the sample values prior to receiving the suspect values to facilitate comparing to the suspect values.

27. The computer-readable medium of claim 26 wherein the aggregating includes counting the number of distinct sample values for each suspect configuration parameter.

28. The computer-readable medium of claim 27 wherein the aggregating includes counting the number of sample components that have each distinct value.

29. The computer-readable medium of claim 23 including identifying a likely correct value for the suspect configuration parameter that is identified as likely causing the component to exhibit the undesired behavior.

30. The computer-readable medium of claim 29 including presenting to a user a ranking of suspect configuration parameters that may be causing the component to exhibit the undesired behavior.

* * * * *